Nov. 5, 1940.                M. C. NELSON                2,220,267
                             MANURE LOADER
                          Filed Nov. 16, 1938
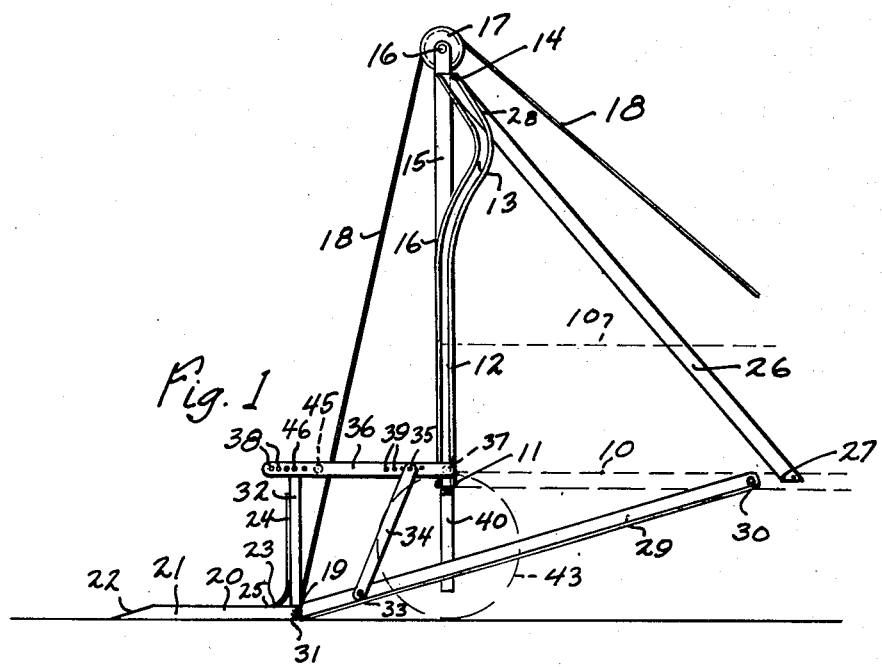
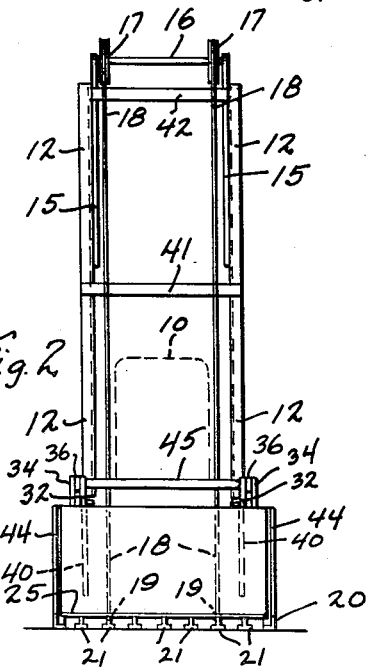
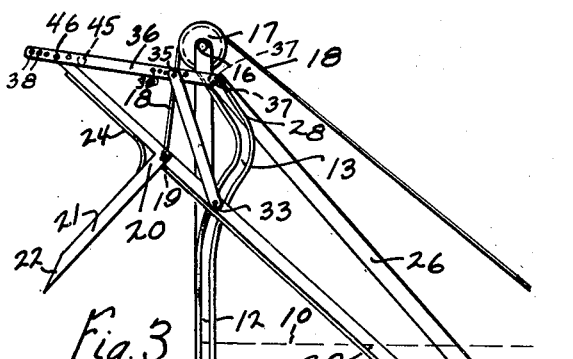
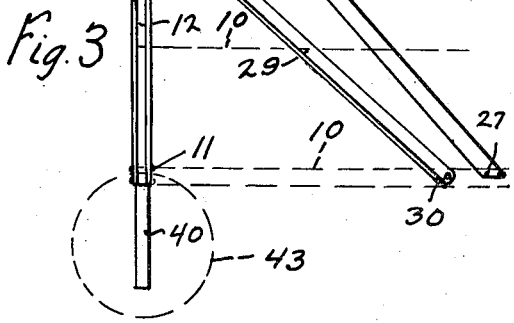
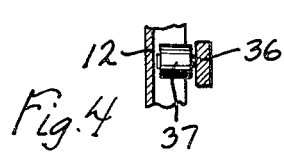
INVENTOR.
Morris C. Nelson
BY
Sam J. Slotoby
ATTORNEY Patented Nov. 5, 1940

2,220,267

UNITED STATES PATENT OFFICE 2,220,267

MANURE LOADER

Morris C. Nelson, Inwood, Iowa

Application November 16, 1938, Serial No. 240,685

4 Claims. (Cl. 214—140)

My invention relates to a loader for manure.

An object of my invention is to provide a loader of this type which can be attached to a standard tractor frame.

A further object of my invention is to provide a manure loader which can be carried by said tractor to any point and the manure loaded thereon.

A further object of my invention is to provide means for conveniently unloading the manure after the same is gathered.

A further object of my invention is to provide a simple mechanism for such unloading, which is not cumbersome.

A further object of my invention is to provide a loader of this type which is adaptable and adjustable to various conditions for such loading and unloading.

A further object of my invention is to provide the above mentioned objects in a structure of simplicity.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of the loader,

Figure 2 is a front view thereof,

Figure 3 is a side elevation of the same showing the loader in the unloading position, and Figure 4 is a detail of the roller.

I have indicated the tractor frame generally by means of the dotted lines and the character 10. Suitably attached at 11 to the usual forward clamps of the tractor is the vertically upright pair of vertically positioned channel members 12, the channel portions, of which face outwardly of the tractor. The channel members 12 extend upwardly and formed integrally therewith are the arcuate portions 13 situated at the top thereof. The members 12 terminate at 14. A pair of vertical brace members 15 are suitably attached at 16 at the inside of the members 12, and extend upwardly and receive the shaft 16 at the top thereof.

Attached to the shaft 16 is the pair of pulleys 17, about which passes the cable 18. The rear end of the cable 18 passes rearwardly to a suitable winch, which is mounted on the tractor. The forward end of the cable 18 is attached at 19 to a suitable cross bar which is part of the gathering member or scraper 20. The scraper 20 is of a construction involving several forwardly extending members 21, which are approximately T-shaped as shown in Fig. 2.

The members 21 include the beveled portion 22 at the front ends thereof. A suitable sheet iron plate 23 is attached to the scraper 20, comprising a vertical portion 24, which extends downwardly and terminates forwardly into the horizontal portion 25. A further brace 26 is rigidly attached at 27 to the tractor frame, and the brace 26 is secured at 28 to the inside of the channel members 12. The lifting bar includes the angle member 29, which is suitably pivoted at 30 to the tractor frame. The member 29 extends forwardly and is pivoted at 31 to the scraper member 20, at the rear thereof.

It will be noted that the scraper member includes the horizontal portion 21 and the vertical angles 32, and it will be noted that the member 20 is thereby fixed in this position and the members 21 and 32 form a right angle which is rigidly fixed in this position at all times. Pivoted at 33 is the further bar 34, which is also pivoted at 35 to the substantially horizontal further bar 36. The bar 36 extends forwardly and is pivoted at 46 to the upright member 32.

A series of openings 38 are provided adjacent the pivoting point 46 to provide adjustability so that the pointed members 21 can be inclined angularly to the surface of ground, if such is desired, so that the manure can be gathered in conditions involving raised surfaces and the like. Further openings 39 are provided at the rear of the bar 36 to provide suitable adjustments to the frame for various purposes.

It will then be seen that the forward and rearward ends of the bar 36 include adjusting means so that pins at 35 and 46 can be inserted in suitable slots for this purpose. A pair of guards 40 is also attached to the tractor adjacent to the lower end of the members 12 and flush therewith. The purpose of these guards is to prevent the members 29 from striking against the external portions of the tractor itself when the member 29 is being elevated and these guards also by being flush with the members 12 permit the arrangement to function satisfactorily. The rear end of the bar 36 includes the roller 37 (see Figs. 1, 3 and 4), which roller is adapted to be received within the channel 12. Suitable bracing bars, such as 41 and 42 are attached transversely of the frame as shown to provide rigidity to the upper part of the structure.

A cylindrical roller 45 is attached between the pair of members 36 and acts as a guard to prevent the cable 18 from rubbing against any of the outer portions of the frame so that the cable will not be worn through in use.

The method of use of my device is as follows. The tractor is driven forwardly with the tines 21 approximately adjacent the surface of the ground, which tines then pass underneath the mass of manure, the tractor is then driven to the unloading position, which is usually a further wagon, or some such device, and it is then ready for the unloading operation, which occurs in the following manner. The winch upon the tractor which is suitably driven is then operated, which pulls the cable, which in turn lifts the forward end of the manure holding portion 20. As the rollers 37 pass upwardly within the channel 12, the point of attachment of the cable 18 is gradually drawn in towards the frame 12. The respective members 32, 34 and 36 are gradually compressed inwardly, which tends to force the portions 21 downward angularly.

At the upper end of the lifting operation and when the roller passes through the arcuate portion 13, the effect is materially increased and the cam effect provided between the roller and the arcuate portion 13 smoothly provides the function of tipping the member 20 to the position shown in Fig. 3, at which position the mass of manure is unloaded into the receptacle provided.

The arcuate portion 13 provides a very useful function in this manner and at the lower part of the rising operation, the tipping effect will not be as extreme as at the upper part thereof. As the roller passes through the upper part of the arc, however, the tipping motion is very rapid and occurs quickly so that the mass of manure will be dropped off in a minimum of time. This effect is due to a great extent, to the fact that since the member 20 is rising at a uniform rate, the rollers in passing through the arcuate portion 13 must pass through a longer path and in this way the unloading at a maximum height is provided in the quickest time.

After this operation, the cable 18 is released and the device is brought back to the normal loading position. It will be seen from this construction that the device is especially adapted for tractors and the like and straddles the forward portions, as well as the tractor wheels 43.

It will now be seen that I have provided a manure loader which can be attached to any standard tractor, which can be carried to any point and the manure loaded thereon or conveniently unloaded, which is simple in structure, which provides an efficient and rapid unloading means, and which can be manufactured at a reasonable cost.

I claim as my invention:

1. A manure loader comprising a pair of vertically positioned channels, a manure receiving member, means for raising said member, means cooperant with said member and said channels to tip the member when the same is elevated, including a plurality of pivoted members forming a pair of spaced trapezoids rearwardly of said receiving member, the rear ends of a pair of said pivoted members including rollers received within said channels, said channels having upper arcuate formations for providing maximum tipping at a maximum rate of said receiving member as the rollers are raised through said arcuate portions, means for attaching said loader to a standard tractor to be moved thereby, means for adjusting normal angularity of said receiving member.

2. A manure loader comprising a pair of vertically positioned channels, a manure receiving member, means for raising said member, means cooperant with said member and said channels to tip the member when the same is elevated, including a plurality of pivoted members forming a pair of spaced trapezoids rearwardly of said receiving member, the rear ends of a pair of said pivoted members including rollers received within said channels, said channels having upper arcuate formations for providing maximum tipping at a maximum rate of said receiving member as the rollers are raised through said arcuate portions, means for attaching said loader to a standard tractor to be moved thereby, guard means attached to said tractor externally of the same to prevent contacting the frame as the movable portions of the loader are raised.

3. A manure loader comprising a pair of spaced vertically positioned channels attached to a tractor, a manure receiving member, a pair of brace bars pivotally attached to said receiving member and said tractor, a plurality of pivoted members forming a pair of spaced trapezoids attached to said bars and said receiving member, a pair of said pivoted members including rollers received within said channels, means for elevating said receiving member, including a pair of pulleys rotatably mounted at the upper ends of said channels, cables passing over said pulleys and attached to said member at one end and to reeling means on said tractor at the other end, said channels having upper arcuate portions to provide maximum tipping and speed thereof as said rollers are raised through said arcuate portions.

4. A manure loader comprising a pair of spaced vertically positioned channels attached to a tractor, a manure receiving member, a pair of brace bars pivotally attached to said receiving member and said tractor, a plurality of pivoted members forming a pair of spaced trapezoids attached to said bars and said receiving member, a pair of said pivoted members including rollers received within said channels, means for elevating said receiving member, including a pair of pulleys rotatably mounted at the upper ends of said channels, cables passing over said pulleys and attached to said member at one end and to reeling means on said tractor at the other end, said channels having upper arcuate portions to provide maximum tipping and speed thereof as said rollers are raised through said arcuate portions, the tipping of said receiving member being further caused by the collapse of the said trapezoidal members.

MORRIS C. NELSON.